United States Patent
Takano

(10) Patent No.: US 9,880,492 B2
(45) Date of Patent: Jan. 30, 2018

(54) IMAGE FORMING APPARATUS

(71) Applicant: Oki Data Corporation, Tokyo (JP)

(72) Inventor: Hiroshi Takano, Tokyo (JP)

(73) Assignee: Oki Data Corporation, Tokyo (JP)

( * ) Notice: Subject to any disclaimer, the term of this patent is extended or adjusted under 35 U.S.C. 154(b) by 0 days.

(21) Appl. No.: 15/241,153

(22) Filed: Aug. 19, 2016

(65) Prior Publication Data
US 2017/0060024 A1 Mar. 2, 2017

(30) Foreign Application Priority Data

Aug. 31, 2015 (JP) .................................. 2015-170170

(51) Int. Cl.
| | | |
|---|---|---|
| G03G 15/00 | (2006.01) | |
| G03G 15/08 | (2006.01) | |
| G03G 21/04 | (2006.01) | |
| H04N 1/04 | (2006.01) | |
| H04N 1/32 | (2006.01) | |
| G03G 15/36 | (2006.01) | |

(52) U.S. Cl.
CPC ..... *G03G 15/0824* (2013.01); *G03G 15/5087* (2013.01); *G03G 21/04* (2013.01); *H04N 1/04* (2013.01); *H04N 1/32352* (2013.01); *G03G 15/36* (2013.01); *G03G 15/6585* (2013.01); *G03G 2215/00126* (2013.01); *H04N 2201/3269* (2013.01)

(58) Field of Classification Search
CPC .............. G03G 15/50; G03G 15/5008; B65H 2220/02; B65H 2220/01; B65H 2220/03
USPC .......................................................... 399/38
See application file for complete search history.

(56) References Cited

U.S. PATENT DOCUMENTS

| | | | |
|---|---|---|---|
| 2002/0018233 A1 | 2/2002 | Mori | |
| 2003/0035131 A1* | 2/2003 | Dukler | ................... B41M 3/144 358/1.14 |
| 2007/0053731 A1* | 3/2007 | Mori | ................... G03G 15/6573 399/341 |

(Continued)

FOREIGN PATENT DOCUMENTS

JP 2008268588 A 11/2008

OTHER PUBLICATIONS

Extended Search Report dated Jan. 26, 2017 in EP Application No. 16182842.1.

*Primary Examiner* — Walter L Lindsay, Jr.
*Assistant Examiner* — Frederick Wenderoth
(74) *Attorney, Agent, or Firm* — Panitch Schwarze Belisario & Nadel LLP

(57) ABSTRACT

An image forming apparatus includes an image forming device which forms an image on a recording medium and an image scanning device which transmits scanned image data to the image forming device. The image forming device includes a receiver, a first image forming unit, a second image forming unit, and a controller. The receiver receives at least one of external image data transmitted from an external device and the scanned image data as input image data. The first image forming unit forms a developer image based on the input image data on the recording medium. The second image forming unit forms a mark image on the recording medium. The controller determines whether to make the second image forming unit form the mark image or not depending on a type of a transmission source of the input image data.

14 Claims, 7 Drawing Sheets

(56) References Cited

U.S. PATENT DOCUMENTS

2008/0315574 A1* 12/2008 Emerich ............... B41M 3/14
 283/91
2009/0220260 A1* 9/2009 Denton ............... G03G 9/0902
 399/49
2015/0116781 A1 4/2015 Tonami

* cited by examiner

| SETTING OPERATION ON OPERATION PANEL | OPERATION AT TIME OF PRINT SETTING | | MARK IMAGE PRINTING |
|---|---|---|---|
| MARK IMAGE : ON | | | PRINT |
| MARK IMAGE : OPTION | PRINT MARK IMAGE ? | YES | PRINT |
| | | NO | NOT PRINT |
| MARK IMAGE : OFF | | | NOT PRINT |

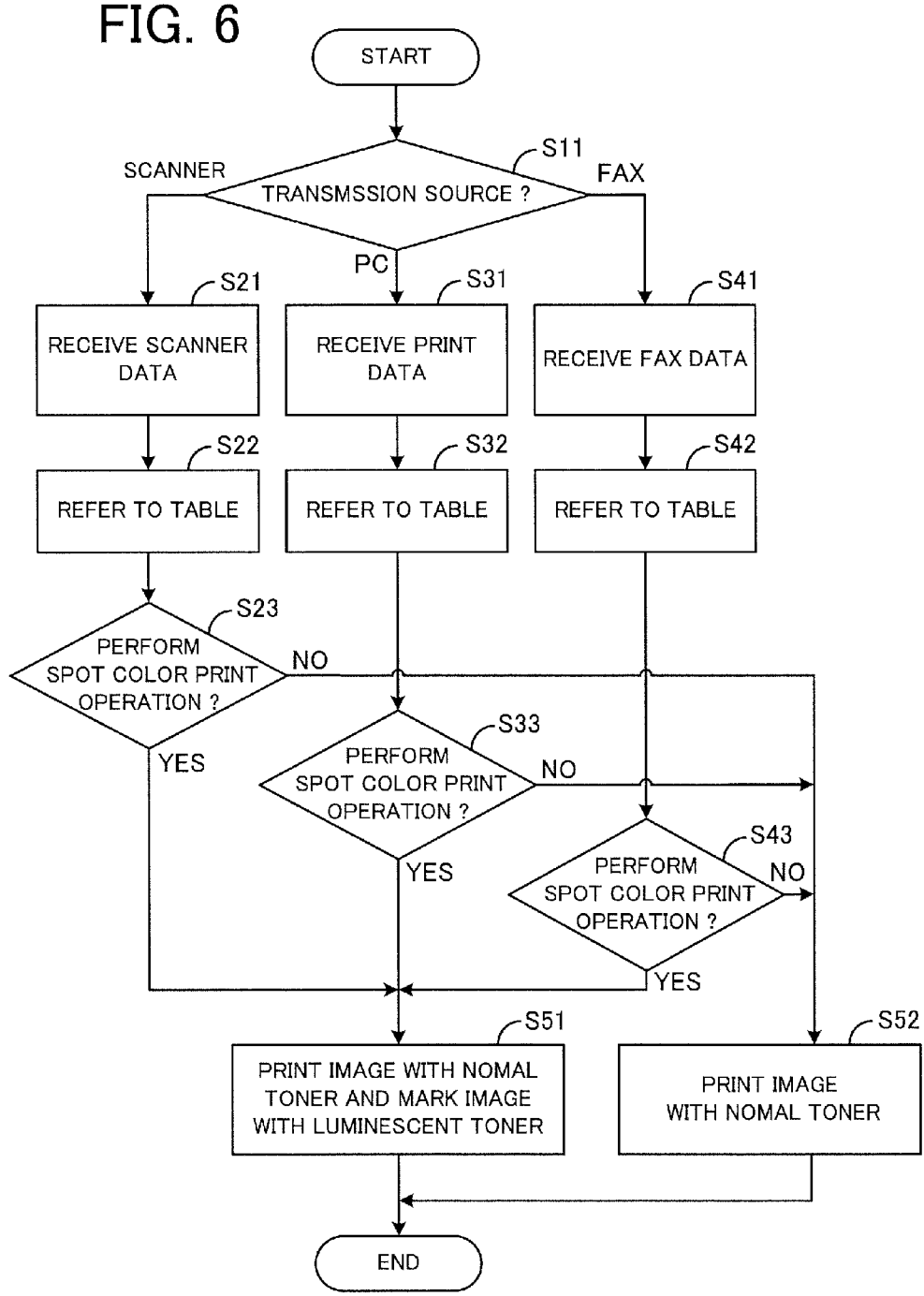

IMAGE FORMING APPARATUS

BACKGROUND OF THE INVENTION

1. Field of the Invention

The present invention relates to an image forming apparatus having a function of forming a mark image with luminescent developer on a recording medium.

2. Description of the Related Art

Conventionally, there is proposed an image forming apparatus that prints a composite image of an image (tag) regarding copy restriction on printed matter and an image based on input image data on a recording medium (see Patent Reference 1: Japanese Patent Application Publication No. 2008-268588, for example)

SUMMARY OF THE INVENTION

However, it is difficult to distinguish the source of the transmission of the input image data on the basis of the image formed by the conventional image forming apparatus. For example, it is difficult to distinguish based on printed matter itself whether an image on the printed matter is an image based on input image data whose transmission source is a client personal computer (PC), an image based on input image data whose transmission source is a facsimile machine, or an image based on scanned image data generated by optically scanning a document with an image scanning device.

An object of the present invention is to provide an image forming apparatus that makes it possible to identify the type of the transmission source of the image printed on the recording medium.

Means for Solving the Problem

An image forming apparatus according to an aspect of the present invention includes an image forming device which forms an image on a recording medium and an image scanning device which transmits scanned image data generated by optically scanning an image to the image forming device. The image forming device includes a receiver, a first image forming unit, a second image forming unit, and a controller. The receiver receives at least one of external image data transmitted from an external device and the scanned image data transmitted from the image scanning device as input image data. The first image forming unit forms a developer image based on the input image data on the recording medium. The second image forming unit forms a mark image on the recording medium with luminescent developer containing a luminescent material. The controller determines whether to make the second image forming unit form the mark image or not depending on a type of a transmission source of the input image data.

According to the present invention, the type of the transmission source of the image printed on the recording medium can be identified.

BRIEF DESCRIPTION OF THE DRAWINGS

FIG. 4 is a diagram showing setting information stored in a storage unit of an image forming device of the image forming apparatus according to the first embodiment in a table format.

FIG. 6 is a flowchart showing an example of the operation of an image forming apparatus according to a second embodiment.

MODE FOR CARRYING OUT THE INVENTION

<<1>> First Embodiment

<<1-1>> Image Forming Apparatus

Figure 1:
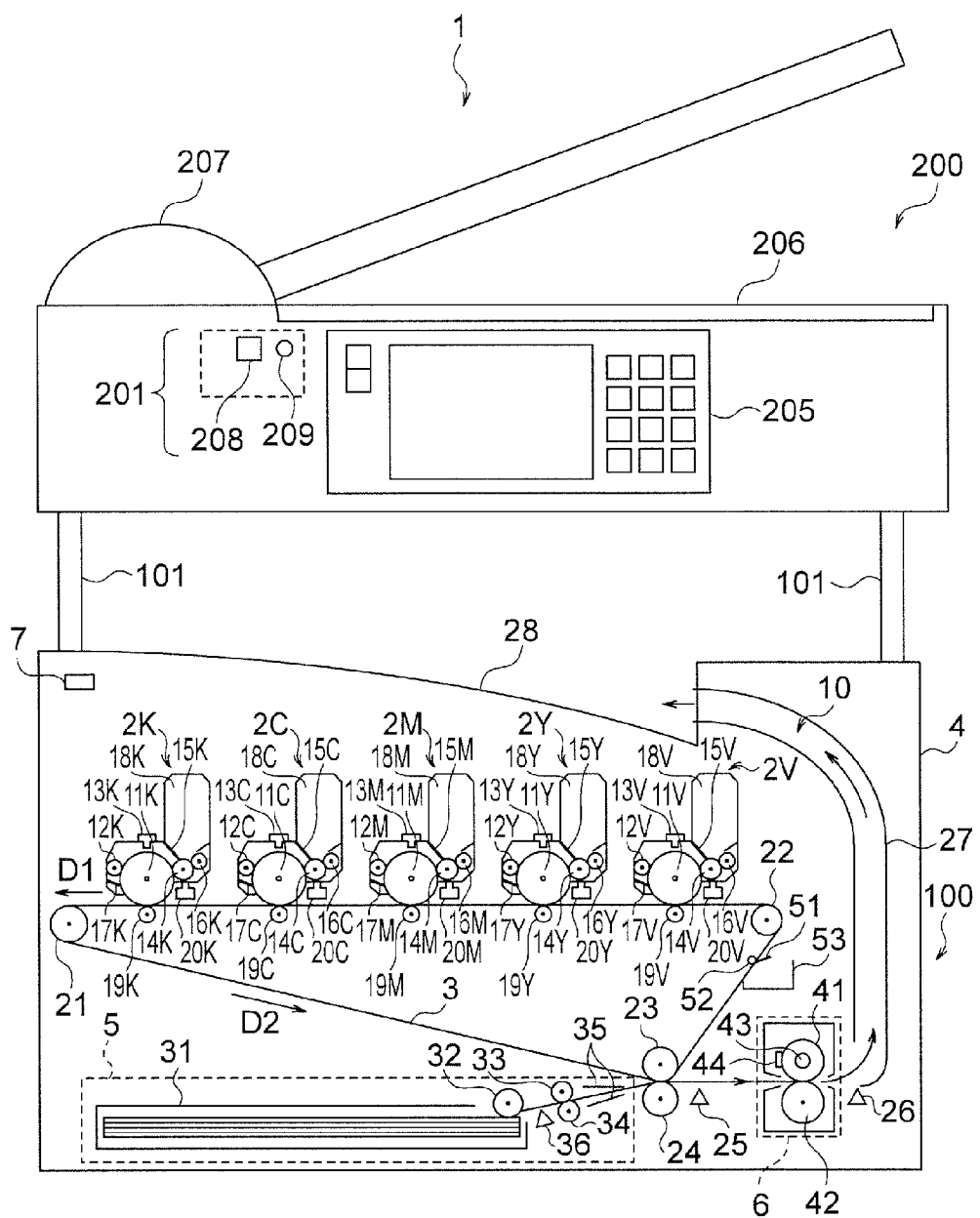
FIG. 1 is a front view (partially longitudinal sectional view) schematically showing the configuration of an image forming apparatus according to an embodiment of the present invention.

FIG. 1 is a front view (partially longitudinal sectional view) schematically showing the configuration of an image forming apparatus 1 according to an embodiment of the present invention. As shown in FIG. 1, the image forming apparatus 1 according to a first embodiment includes an image forming device (referred to also as a "printing unit") 100 which forms an image on a sheet of paper (also referred to as a sheet) as a recording medium and an image scanning device (referred to also as a "scanner unit") 200 which generates scanner data Ds as scanned image data by optically scanning an image and transmits the scanner data Ds to the image forming device 100. The image scanning device 200 is supported on the upper side of the image forming device 100 by support members 101 provided on a housing 4 of the image forming device 100. However, the positional relationship between the image forming device 100 and the image scanning device 200 is not limited to the example shown in FIG. 1. Further, the image forming device 100 and the image scanning device 200 do not necessarily have to be provided as units separate from each other. The image forming device 100 and the image scanning device 200 may be provided in one housing.

In the present embodiment, a process of forming the image (i.e., a developer image) on the sheet with developer (developing agent) such as toner and ink on the basis of image data (input image data) transmitted from the image scanning device 200 or an external device is referred to as "developing".

As shown in FIG. 1, the image forming device 100 includes first process units 2Y, 2M, 2C and 2K as first image forming units, a second process unit 2V as a second image forming unit and an intermediate transfer belt 3.

The first process units 2Y, 2M, 2C and 2K respectively form a toner image as the developer image of yellow (Y) color, a toner image as the developer image of magenta (M) color, a toner image as the developer image of cyan (C) color, and a toner image as the developer image of black (B) color on the intermediate transfer belt 3 by means of electrophotography.

The second process unit 2V forms a toner image as the developer image with luminescent toner as luminescent developer (V) (e.g., a mark image) on the intermediate transfer belt 3 by means of electrophotography.

The first process units 2Y, 2M, 2C and 2K can be identical in structure with each other except that the colors of the toner as the developer used for the units differ from each other. The second process unit 2V can be identical in structure with the first process units 2Y, 2M, 2C and 2K except that the type of the toner as the developer used for the unit is different.

The second process unit 2V and the first process units 2Y, 2M, 2C and 2K are arranged in this order (tandem arrangement) in the conveyance direction (D1 direction) of the intermediate transfer belt 3. While the image forming apparatus 1 of the intermediate transfer type employing the intermediate transfer belt 3 is illustrated in FIG. 1, the present invention is applicable also to image forming apparatuses including no intermediate transfer belt and making the first process units 2Y, 2M, 2C and 2K and the second process unit 2V directly transfer toner images onto the recording medium. Further, the order of arrangement of the second process unit 2V and the first process units 2Y, 2M, 2C and 2K is not limited to the example shown in FIG. 1. Furthermore, while four first process units 2Y, 2M, 2C and 2K are shown in FIG. 1, the number of first process units can be other than four as long as the number is one or more (at least one).

The first process units 2Y, 2M, 2C and 2K respectively include photosensitive drums 11Y, 11M, 11C and 11K as image carriers, charging rollers 12Y, 12M, 12C and 12K as charging units, LED (Light Emitting Diode) heads 13Y, 13M, 13C and 13K as exposure units, development rollers 14Y, 14M, 14C and 14K as developer carriers, development blades 15Y, 15M, 15C and 15K as developer regulation members, supply rollers 16Y, 16M, 16C and 16K as developer supply units, cleaning blades 17Y, 17M, 17C and 17K as developer removal members, and toner cartridges 18Y, 18M, 18C and 18K as developer supply units.

The second process unit 2V includes a photosensitive drum 11V as an image carrier, a charging roller 12V as a charging unit, an LED head 13V as an exposure unit, a development roller 14V as a developer carrier, a development blade 15V as a developer regulation member, a supply roller 16V as a developer supply unit, a cleaning blade 17V as a developer removal member, and a toner cartridge 18V as a developer supply unit. Incidentally, the second process unit 2V and the first process units 2Y, 2M, 2C and 2K will be referred to also as "process units 2V, 2Y, 2M, 2C and 2K".

The photosensitive drums 11V, 11Y, 11M, 11C, and 11K are rotatably supported in the corresponding process units 2V, 2Y, 2M, 2C, and 2K respectively. The charging rollers 12V, 12Y, 12M, 12C, and 12K uniformly charge the surface of the corresponding photosensitive drums 11V, 11Y, 11M, 11C, and 11K by applying a predetermined voltage to the photosensitive drums 11V, 11Y, 11M, 11C, and 11K respectively.

Each of the LED heads 13V, 13Y, 13M, 13C, and 13K has a plurality of light-emitting devices (LEDs) arranged in a main scan direction (direction orthogonal to the sheet of FIG. 1 and orthogonal to the D1 direction). Each of the LED heads 13Y, 13M, 13C, and 13K forms an electrostatic latent image on the uniformly charged surface of the corresponding photosensitive drums 11Y, 11M, 11C, and 11K by irradiating light based on input image data (data Di in FIG. 2 which will be explained later) to the surface of the photosensitive drum 11Y, 11M, 11C, and 11K respectively.

The LED head 13V forms an electrostatic latent image on the uniformly charged surface of the photosensitive drum 11V by irradiating light based on mark image data (e.g., data stored in a storage unit 140 (memory) in FIG. 2 which will be explained later) to the surface of the photosensitive drum 11V.

Each of the development rollers 14V, 14Y, 14M, 14C, and 14K forms a toner image by having a toner adhere to the electrostatic latent image on the photosensitive drums 11V, 11Y, 11M, 11C, and 11K respectively. Each of the development blades 15V, 15Y, 15M, 15C, and 15K regulates the thickness of the toner supplied to the surface of the corresponding development rollers 14V, 14Y, 14M, 14C, and 14K and thereby forms a thin layer of the toner, respectively. Each of the supply rollers 16V, 16Y, 16M, 16C, and 16K makes contact with the corresponding development rollers 14V, 14Y, 14M, 14C, and 14K and supplies the toner from the corresponding toner cartridges 18V, 18Y, 18M, 18C, and 18K to the development rollers 14V, 14Y, 14M, 14C, and 14K respectively. Each of the toner cartridges 18V, 18Y, 18M, 18C, and 18K stores the toner.

Each of the cleaning blades 17V, 17Y, 17M, 17C, and 17K wipes off fogging toner and transfer residual toner remaining on the surface of the corresponding photosensitive drums 11V, 11Y, 11M, 11C, and 11K and reversely transferred toner from the process units 2V, 2Y, 2M, 2C, and 2K situated upstream of the intermediate transfer belt 3 in the conveyance direction, respectively.

The image forming device 100 includes primary transfer rollers 19V, 19Y, 19M, 19C and 19K. The primary transfer rollers 19V, 19Y, 19M, 19C and 19K are arranged to respectively face the photosensitive drums 11V, 11Y, 11M, 11C and 11K across the intermediate transfer belt 3. Each of the primary transfer rollers 19V, 19Y, 19M, 19C, and 19K presses the intermediate transfer belt 3 in cooperation with the corresponding photosensitive drums 11V, 11Y, 11M, 11C, and 11K and thereby transfers the toner image to the surface (outer circumferential surface) of the intermediate transfer belt 3, respectively.

The process units 2V, 2Y, 2M, 2C and 2K may be equipped with up/down solenoids 20V, 20Y, 20M, 20C and 20K, respectively. Each of the up/down solenoids 20V, 20Y, 20M, 20C, and 20K moves the corresponding process units 2V, 2Y, 2M, 2C, and 2K (in the vertical direction in FIG. 1) so that the photosensitive drums 11V, 11Y, 11M, 11C, and 11K of the process units 2V, 2Y, 2M, 2C, and 2K contacts or separates from the intermediate transfer belt 3, respectively. Each of the up/down solenoids 20V, 20Y, 20M, 20C, and 20K carries out the switching between a contact state (use state) in which the process units 2V, 2Y, 2M, 2C, and 2K is in contact with the intermediate transfer belt 3 and a separate state (non-use state) in which the process units 2V, 2Y, 2M, 2C, and 2K is separated from the intermediate transfer belt 3, respectively.

The intermediate transfer belt 3 in an endless shape is formed of a high-resistance semiconductive plastic film, for example. The intermediate transfer belt 3 is stretched at predetermined tension by a drive roller 21, a driven roller 22 and a secondary transfer counter roller 23. The drive roller 21 is rotated by a belt motor working as a transfer belt drive unit and carries (moves) the intermediate transfer belt 3 in the directions of arrows D1 and D2. The driven roller 22 rotates according to the movement of the intermediate transfer belt 3. A top part of the intermediate transfer belt 3 is stretched between the photosensitive drums 11V, 11Y, 11M, 11C and 11K and the primary transfer rollers 19V, 19Y, 19M, 19C and 19K. The intermediate transfer belt 3 is pressed by the primary transfer rollers 19V, 19Y, 19M, 19C and 19K against the photosensitive drums 11V, 11Y, 11M, 11C and 11K. Parts where the intermediate transfer belt 3 and the photosensitive drums 11V, 11Y, 11M, 11C and 11K are in contact with each other will be referred to as "primary transfer nip parts". In the primary transfer nip parts, the toner images on the photosensitive drums 11V, 11Y, 11M, 11C, and 11K are transferred to the intermediate transfer belt 3 by applying a predetermined DC voltage from a primary transfer voltage generation unit to the primary transfer rollers 19V, 19Y, 19M, 19C, and 19K respectively.

The image forming device 100 includes a sheet feed mechanism 5 which supplies sheets to a conveyance path 10. In the example of FIG. 1, the sheet feed mechanism 5 is provided under the process units 2V, 2Y, 2M, 2C and 2K and the intermediate transfer belt 3. The sheet feed mechanism 5 includes a sheet storage cassette 31 as a media cassette, a hopping roller 32 as a sheet feed roller, a pinch roller 33 and a resist roller 34 constituting a conveyance roller pair, a guide 35, and a sheet feed sensor 36. Sheets of paper as the recording medium are stacked and stored in the sheet storage cassette 31. The hopping roller 32 sends out each sheet stored in the sheet storage cassette 31 to the pinch roller 33 and the resist roller 34. The pinch roller 33 corrects a skew of the sheet when the sheet is skewed (fed obliquely). The resist roller 34 sends out the sheet to a secondary transfer roller 24 arranged at a position facing the secondary transfer counter roller 23 across the intermediate transfer belt 3. The guide 35 guides the sheet to the secondary transfer roller 24. The sheet feed sensor 36 detects the sheet reaching a position between the pinch roller 33 and the resist roller 34.

The image forming device 100 includes the secondary transfer roller 24 and the secondary transfer counter roller 23. The secondary transfer roller 24 rotates according to the movement of the intermediate transfer belt 3. The intermediate transfer belt 3 is pressed by the secondary transfer roller 24 against the secondary transfer counter roller 23. A part where the secondary transfer roller 24 and the intermediate transfer belt 3 are in contact with each other will be referred to as a "secondary transfer nip part". In the secondary transfer nip part, the toner image (including the mark image) on the intermediate transfer belt 3 is secondarily transferred to the sheet by applying a predetermined DC voltage, supplied from a secondary transfer voltage generation unit controlled by a drive control section 123, to the secondary transfer roller 24.

The image forming device 100 includes a fixing unit 6. In the example of FIG. 1, the fixing unit 6 is arranged on the downstream side of the secondary transfer nip part in the conveyance path 10. Further, the image forming device 100 includes a secondary transfer ejection sensor 25 arranged between the secondary transfer roller 24 and the fixing unit 6. The secondary transfer ejection sensor 25 monitors the conveyance path 10 to check for winding of the sheet around the secondary transfer roller 24, separation of the sheet from the intermediate transfer belt 3, and so on.

The fixing unit 6 includes a heat roller 41, a pressure roller 42, a heater 43 and a thermistor 44. The heat roller 41 is driven by a fixing unit drive section such as a heater motor. The pressure roller 42 is arranged so as to face the heat roller 41 across the conveyance path 10. The pressure roller 42 rotates according to the rotation of the heat roller 41 and presses against the heat roller 41. The heater 43 is a halogen lamp or the like functioning as a heat source. The heater 43 is provided inside the heat roller 41 and heats the heat roller 41. The thermistor 44 is arranged in the vicinity of the heat roller 41 and measures the surface temperature of the heat roller 41. The fixing unit 6 heats and fuses the toner on the sheet conveyed along the conveyance path 10 between the heat roller 41 and the pressure roller 42 and thereby fixes the toner image on the sheet.

The image forming device 100 includes a fixation ejection sensor 26. In the example of FIG. 1, the fixation ejection sensor 26 is arranged on the downstream side of the fixing unit 6 in the media conveyance direction in the conveyance path 10. The fixation ejection sensor 26 monitors the fixing unit 6 to check for a paper jam, winding of the sheet around the heat roller 41, and so on. in the fixing unit 6.

In the image forming device 100, a guide 27 for conveying the sheet to a stacker 28 at the upper end part of the housing 4 is provided on the downstream side of the fixation ejection sensor 26 in the media conveyance direction in the conveyance path 10. The sheet after being printed on is ejected into the stacker 28 through the guide 27.

Further, in the image forming device 100, a cleaning blade 51 for removing secondary transfer residual toner remaining on the intermediate transfer belt 3 without being transferred to the sheet in the secondary transfer is arranged on the downstream side of the secondary transfer nip part of the intermediate transfer belt 3 to face a cleaning blade counter roller 52. The cleaning blade 51, which is made of a flexible rubber material or a plastic material, scrapes off the secondary transfer residual toner remaining on the intermediate transfer belt 3 into a waste toner tank 53.

The image forming device 100 may include an environmental sensor 7 for measuring the temperature and the humidity as environmental conditions. For example, before the start of the print operation, the image forming device 100 determines the process unit (process unit 2V, 2Y, 2M, 2C or 2K) that should contact or separate from the intermediate transfer belt 3 based on the temperature and the humidity measured by the environmental sensor 7, and carries out the switching between the contact state and the separate state.

Figure 2:
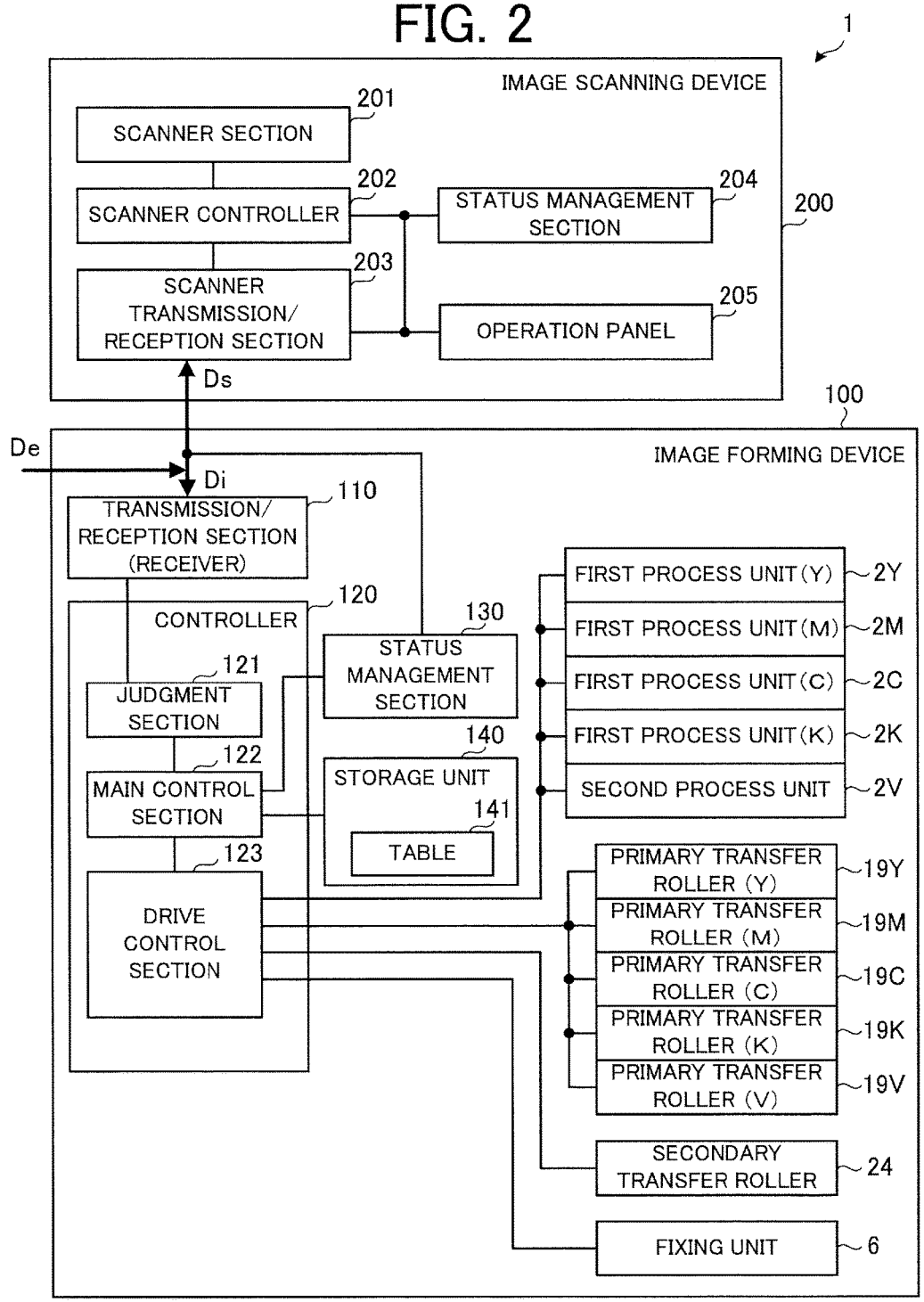
FIG. 2 is a block diagram schematically showing the configuration of a control system of the image forming apparatus according to the first embodiment.

FIG. 2 is a block diagram schematically showing the configuration of a control system of the image forming apparatus 1 according to the first embodiment. As shown in FIG. 2, the image scanning device 200 includes a scanner section 201 which generates the scanner data Ds as the scanned image data by optically scanning the image of a document, a scanner controller 202 (scanner control section) which controls the operation of the image scanning device 200, and a scanner transmission/reception section 203 (scanner transmitting-receiving section) as a transmission unit for transmitting the scanner data Ds generated by the scanner section 201 to the image forming device 100. Further, the image scanning device 200 may include a status management section 204 (image forming device status management section) for managing the operating status of the image forming device 100 and an operation panel 205 as a user interface.

As shown in FIG. 1, the scanner section 201 generally includes contact glass 206 as document table glass on which a document as the object of the scanning can be set, a line sensor 208 as an optical sensor for optically scanning the image of the document on the contact glass 206, and a light source lamp 209 for illuminating the document. The scanner section 201 may include an auto-feeder (automatic document feeder: ADF) 207 for moving the document. Further, the scanner section 201 may include a movement mechanism for moving the line sensor 208 and the light source lamp 209.

The operation panel 205 includes a display mechanism such as a liquid crystal display device and a switch (operation buttons of the touch panel type), for example. The operation panel 205 is operated by an operator (user). Each sheet of the document as the object of the scanning can be set one by one on the contact glass 206. The auto-feeder 207 successively extracts each sheet of the document set thereon and conveys the extracted sheet to a scannable position of the scanner section 201.

Further, as shown in FIG. 2, the image forming device 100 includes a transmission/reception section 110 (receiver) which receives external image data De transmitted from the external device or the scanner data Ds transmitted from the image scanning device 200 as input image data Di, the first process units 2Y, 2M, 2C and 2K which form a toner image based on the input image data Di on the sheet, the second process unit 2V which forms a mark image of the luminescent toner on the sheet, and a controller 120 which determines whether to make the second process unit form the mark image or not depending on the type of the source of the transmission of the input image data Di. The controller 120 includes a central processing unit (CPU), for example. Further, the controller 120 may include a memory such as a random access memory (RAM) and a read only memory (ROM).

The luminescent toner contains a luminescent material (e.g., a fluorescent substance) that emits visible light when a light source (e.g., an atom of the luminescent material) transits from an excited state to a lower energy state (e.g., a lower excited state or the ground state). The luminescent material transits from the lower energy state to the excited state by receiving energy. For example, the luminescent material transits from the ground state to the excited state by receiving ultraviolet rays as the energy and returns to the ground state by emitting visible light.

The external device is a facsimile machine, a personal computer (host PC) or an information storage device (e.g. USB memory), for example.

The controller 120 includes, for example, a judgment section 121 (data type judgment section) which judges the type of the transmission source of the input image data Di, a drive control section 123 (print operation controller) which drives each component of the image forming apparatus 1, and a main control section 122. Further, the image forming device 100 may include a status management section 130 (scanner unit status management section) for managing the operating status of the image scanning device 200 and a storage unit 140 for storing superimposition information (image superimposition setting) as information indicating whether or not the mark image should be printed by superimposing the mark image on an image formation region (printable region on the sheet).

In the first embodiment, when the type of the transmission source is the image scanning device 200, the controller 120 can make the second process unit 2V form the mark image. The mark image formed in such cases includes at least one of a letter (including a character), a figure such as a circle and a triangle, a symbol (e.g. "COPY"), and a combination of some of them indicating that the transmission source is the image scanning device 200.

In the first embodiment, when the type of the transmission source of the input image data Di is an external device, the controller 120 can make the second process unit 2V not form the mark image. However, the controller 120 may make the second process unit 2V form a mark image indicating the type of the external device as the transmission source in cases where the type of the transmission source is an external device. In cases where the external device is one of a facsimile machine, a personal computer, and an information storage device, the mark image formed by the second process unit can include at least one of the letter, the figure, the symbol (e.g., "FAX", "PC", "USB", etc.), and a combination of some of them indicating one of the facsimile machine, the personal computer, and the information storage device as the type of the transmission source.

The transmission/reception section 110 of the image forming device 100 carries out the transmission/reception of print data as a request signal for a print operation between itself and the external device (e.g., a host computer 300 as a personal computer transmitting print information or a facsimile machine (FAX) 400). Further, the transmission/reception section 110 of the image forming device 100 carries out the transmission/reception of scan data (scanned data) between itself and the scanner transmission/reception unit 203 of the image scanning device 200.

The judgment section 121 judges the type of the transmission source of the input image data Di received from the transmission/reception section 110.

The controller 120 controls each part of the image forming device 100. In order to control the print operation, the drive control section 123 of the controller 120 controls parts such as the process units 2V, 2Y, 2M, 2C and 2K, the primary transfer rollers 19V, 19Y, 19M, 19C and 19K, the secondary transfer roller 24 and the fixing unit 6. The status management section 130 of the image forming device 100 stores information indicating the operating status of the image scanning device 200, that is, information indicating whether the image scanning device 200 is in a driving state or on standby (a waiting state). The main control section 122 issues commands to the drive control section 123 so as to switch the print speed based on the operating status of the image scanning device 200.

Meanwhile, in the image scanning device 200, the scanner controller 202 controls the scanner section 201 in order to perform a scanner scanning operation, while controlling each part of the image scanning device 200. The operation panel 205 receives requests for the scanner scanning operation and print (copy) commands based on operations by the operator. The scanner transmission/reception unit 203 as a scanning operation request reception unit transmits the print (copy) request received from the operation panel 205 to the transmission/reception section 110 of the image forming device 100. Further, the scanner transmission/reception unit 203 transmits various signals and the scan data (scanned data) received from the scanner section 201 via the scanner controller 202 to and receives them from the transmission/reception section 110 of the image forming device 100. The scanner transmission/reception unit 203 and the transmission/reception section 110 of the image forming device 100 are capable of transmitting and receiving data with each other via wiring in the support members 101, for example. The status management section 204 of the image scanning device 200 stores information indicating the operating status of the image forming device 100, that is, information indicating whether the image forming device 100 is in a driving state or on standby (a waiting state). The scanner controller 202 is capable of performing control so as to switch the scanning speed of the scanner section 201 based on the operating status of the image forming device 100.

1-2 Luminescent Toner in Embodiment

The luminescent toner used in the second process unit 2V is produced by the dissolution suspension method, for example. Binder resin in the luminescent toner is thermoplastic resin such as vinyl resin, polyamide resin, polyester resin and polyurethane resin.

Examples of a solvent usable as an organic solvent for dissolving the binder resin in the production of the luminescent toner include, for instance, (A1) hydrocarbon-based solvents such as ethyl acetate, xylene and hexane, (A2) ester-based solvents such as methyl acetate, ethyl acetate, butyl acetate and isopropyl acetate, (A3) ether-based solvents such as diethyl ether, and (A4) ketone-based solvents such as acetone, methyl ethyl ketone, di-isobutyl ketone, cyclohexanone and methylcyclohexane.

Examples of a parting agent in the luminescent toner include, for instance, (B1) higher fatty acids and their metallic salts, (B2) fatty acid amides, (B3) ester waxes, and (B4) aliphatic hydrocarbon-based waxes such as paraffin/polyolefin-based waxes and their modified products.

Examples of inorganic powder used for the production of the luminescent toner include, for instance, (C1) metallic oxides of metals such as zinc, aluminum, cerium, cobalt, iron, zirconium, chromium, manganese, strontium, tin and antimony, (C2) complex metallic oxides such as calcium titanate, magnesium titanate and strontium titanate, (C3) metallic salts such as barium sulfate, calcium carbonate, magnesium carbonate and aluminum carbonate, (C4) clay minerals such as kaolin, (C5) phosphate compounds such as apatite, (C6) silicides such as silica, silicon carbide and silicon nitride, and (C7) carbon powder such as carbon black and graphite.

A suspension stabilization agent used for the production of the luminescent toner is desired to be an agent that can be removed by use of acid having no affinity with the solvent since the toner particles are granulated in the state of adhering to surfaces of particles after being dispersed, for example. Desirable suspension stabilization agents are, for example, calcium carbonate, calcium chloride, sodium hydrocarbon, potassium hydrocarbon, hydroxyapatite, tricalcium phosphate, and the like.

Next, an example of the production in a case where the luminescent toner is fluorescent toner which emits light by being irradiated with ultraviolet rays (UV toner) will be described below.

(E1) As the resin material, polyester resin having an acid value (the amount of potassium hydroxide in units of mg necessary for neutralizing free fatty acid existing in 1 g of fat) of 2.9 mgKOH/g and weight-average molecular weight (in terms of styrene) in the vicinity of 220000 (hereinafter referred to as "polyester resin material") is used.
(E2) As the parting agent, WEP-4 (produced by NOF Corporation) as ester wax is used.
(E3) As a fluorescent substance, EXL-A830F (produced by Sinloihi Co., Ltd.) is used. EXL-A830F has solubility of 10% or higher to ethyl acetate. The color of fluorescence of EXL-A830F is blue.
(E4) As charging control resin (CCR), Acrybase FCA-726 (produced by Fujikura Kasei Co., Ltd.) is used.
(E5) As the solvent, ethyl acetate is used.

A reason for selecting a substance soluble to ethyl acetate as the fluorescent substance is that a pigment dispersant used for the pigments of the common four colors (yellow, magenta, cyan, and black) adds its own color to the printed image and the use of such a pigment dispersant should be avoided in order to secure the transparency of the printed image (the mark image printed with the luminescent toner). Another reason for selecting a substance soluble to ethyl acetate as the fluorescent substance is that a fluorescent substance as an ingredient insoluble to ethyl acetate turns into toner and makes it impossible to secure the transparency of the printed image in the printing.

In the toner of the common four colors (yellow, magenta, cyan, and black), the pigment (color material) is added generally in an amount of approximately 5-10% with respect to the binder resin. Thus, if the fluorescent substance to be used is soluble to ethyl acetate at a ratio of 2.5% or higher, the fluorescent substance can be added in an amount of 10% or higher with respect to the binder resin (when the ratio of the binder resin to ethyl acetate is 100 to 25). However, if the solubility to ethyl acetate is 2.5%, for example, it is expected that precipitation of the fluorescent substance occurs in an ethyl acetate removal step in the dissolution suspension method and the dispersion of the fluorescent substance and the securement of the transparency of the printed image become difficult. Accordingly, the fluorescent substance to be used is desired to be selected from fluorescent substances that are soluble to ethyl acetate in an amount of 5% or higher in consideration of a reserve of solubility.

The composition of the liquid mixture of these materials (hereinafter referred to as a "dispersed phase") is as follows, for example:
E1: polyester resin material 145 pts.wt.
E2: WEP-4 as the parting agent 7.8 pts.wt.
E3: EXL-A830F as the fluorescent substance 0.6 pts.wt.-9.0 pts.wt.
(0.41%-6.21% with respect to the binder resin)
E4: FCA-726 as the charging control resin 0.22 pts.wt.
E5: ethyl acetate as the solvent 600 pts.wt.

Incidentally, it is also possible to add materials other than those described above, such as a charging control agent and inorganic powder, as needed within an extent that they do not color the toner particles. The dispersed phase described above is heated and stirred at 50° C., for example, until solid materials disappear.

On the other hand, the composition of a continuous phase is as follows, for example:
(Composition of Continuous Phase)
water 3000 pts.wt.
trisodium phosphate 12-hydrate 102 pts.wt.

The continuous phase described above was dissolved by mixing and heating up to 60° C. and thereafter dilute nitric acid for pH control was added. Subsequently, aqueous solution of calcium chloride obtained by dissolving 49.2 pts.wt. of anhydrous calcium chloride in 500 pts.wt. of pure water and heating up to 60° C. is added, and an aqueous medium (suspension stabilization agent solution) containing calcium phosphate is obtained by performing high-speed stirring at 10000 rpm for 5 minutes by using Neo Mixer (produced by Primix Corporation).

The aforementioned dispersed phase was mixed into this continuous phase and granulation was conducted by further performing high-speed stirring at 8000 rpm for 30 seconds. Thereafter, ethyl acetate is removed by means of reduced-pressure distillation.

A base toner is obtained by cooling down the slurry, conducting acid washing and dehydration to remove the suspension stabilization agent, conducting aqueous rinsing, and thereafter conducting dehydration and drying. In the acid washing and the aqueous rinsing, no desorption or elution of the fluorescent substance was observed.

An external additive toner was produced by adding 1.0 pts.wt. of hydrophobic silica R-8200 (produced by Nippon Aerosil Co., Ltd., average primary particle diameter: 12 nm) to 100 pts.wt. of the base toner and mixing them together by using Hensel Mixer (produced by Mitsui Mining Company Limited).

It is also possible to produce the UV toner while changing the type of the fluorescent substance to EXL-A831F (produced by Sinloihi Co., Ltd., solubility to ethyl acetate: 10% or higher, luminescent color: green). In this case, the amount of the fluorescent substance is desired to be within a range from 0.41% to 8.28% with respect to the binder resin.

It is also possible to produce the UV toner while changing the type of the fluorescent substance to SOM-5-0114 (Orient Chemical Industries Co., Ltd., solubility to ethyl acetate: 10% or higher, luminescent color: red). In this case, the amount of the fluorescent substance is desired to be within a range from 0.41% to 2.07% with respect to the binder resin.

<<1-3>> Operation of Embodiment

Figure 3:
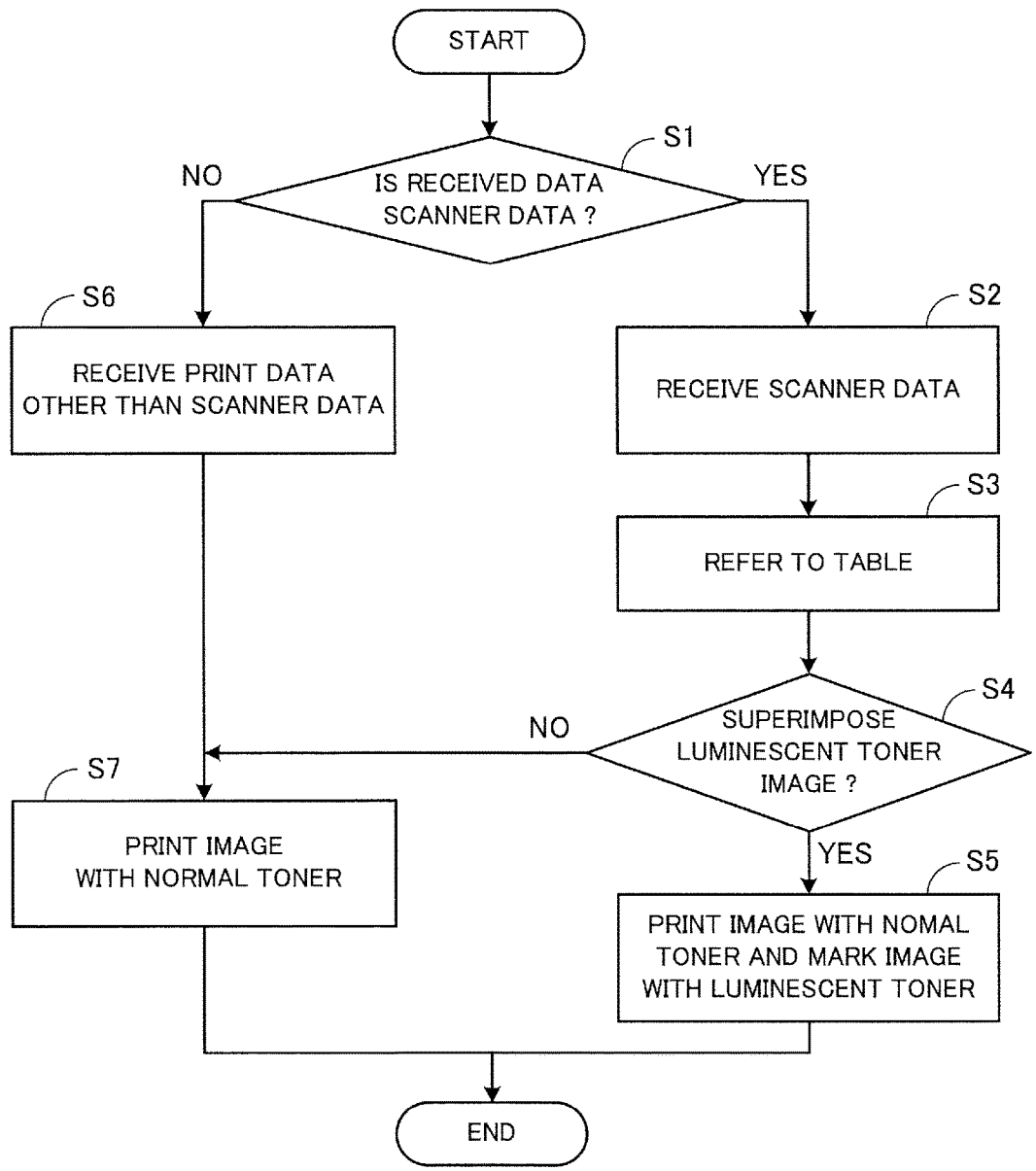
FIG. 3 is a flowchart showing an example of the operation of the image forming apparatus according to the first embodiment.

FIG. 3 is a flowchart showing an example of the operation of the image forming device 100 of the image forming apparatus 1 according to the first embodiment. First, the judgment section 121 of the controller 120 judges whether or not the input image data (received data) Di received by the transmission/reception section 110 is scanner data Ds whose transmission source is the image scanning device 200 (step S1). Specifically, the judgment section 121 judges whether the input image data Di is scanner data Ds or external image data De whose transmission source is an external device.

When the input image data Di is judged to be scanner data Ds in the step S1, the main control section 122 of the controller 120 receives the scanner data Ds (step S2).

Subsequently, the main control section 122 of the controller 120 refers to a table 141 regarding the image superimposition setting (setting in regard to the mark image of the luminescent toner) stored in the storage unit 140 (step S3).

FIG. 4 is a diagram showing an example of the table 141. The table 141 is set in the storage unit 140 according to operations on the operation panel 205, for example. The table 141 includes a mark image "ON" setting as a setting for printing the mark image of the luminescent toner on the sheet, a mark image "OPTION" setting as a setting for making a display for asking the user whether or not to print the mark image of the luminescent toner on the sheet, and a mark image "OFF" setting as a setting for not printing the mark image of the luminescent toner on the sheet.

Subsequently, the main control section 122 of the controller 120 judges whether to perform the printing of the mark image of the luminescent toner (referred to also as a "spot color print operation") or not (step S4). When the image superimposition setting is the mark image "ON" setting, the judgment in the step S4 is YES and the main control section 122 of the controller 120 controls the drive control section 123 so as to perform the printing with normal toner on the basis of the scanner data Ds while controlling the drive control section 123 so as to print the mark image of the luminescent toner (step S5). The normal toner in the present application means toner used in the image forming device 100 other than the luminescent toner, such as the yellow toner, the magenta toner, the cyan toner and the black toner.

When the input image data Di is judged not to be scanner data Ds in the step S1 (NO in the step S1), the main control section 122 of the controller 120 receives external image data De whose transmission source is an external device different from the image scanning device 200 (e.g. print data whose transmission source is a host PC, FAX data whose transmission source is a facsimile machine, or print data whose transmission source is an external information storage device) (step S6).

When the judgment in the step S4 is NO or after the step S6, the main control section 122 of the controller 120 controls the drive control section 123 so as to perform the printing with the normal toner on the basis of the input image data Di without carrying out the printing of the mark image of the luminescent toner (step S7).

Figure 5:
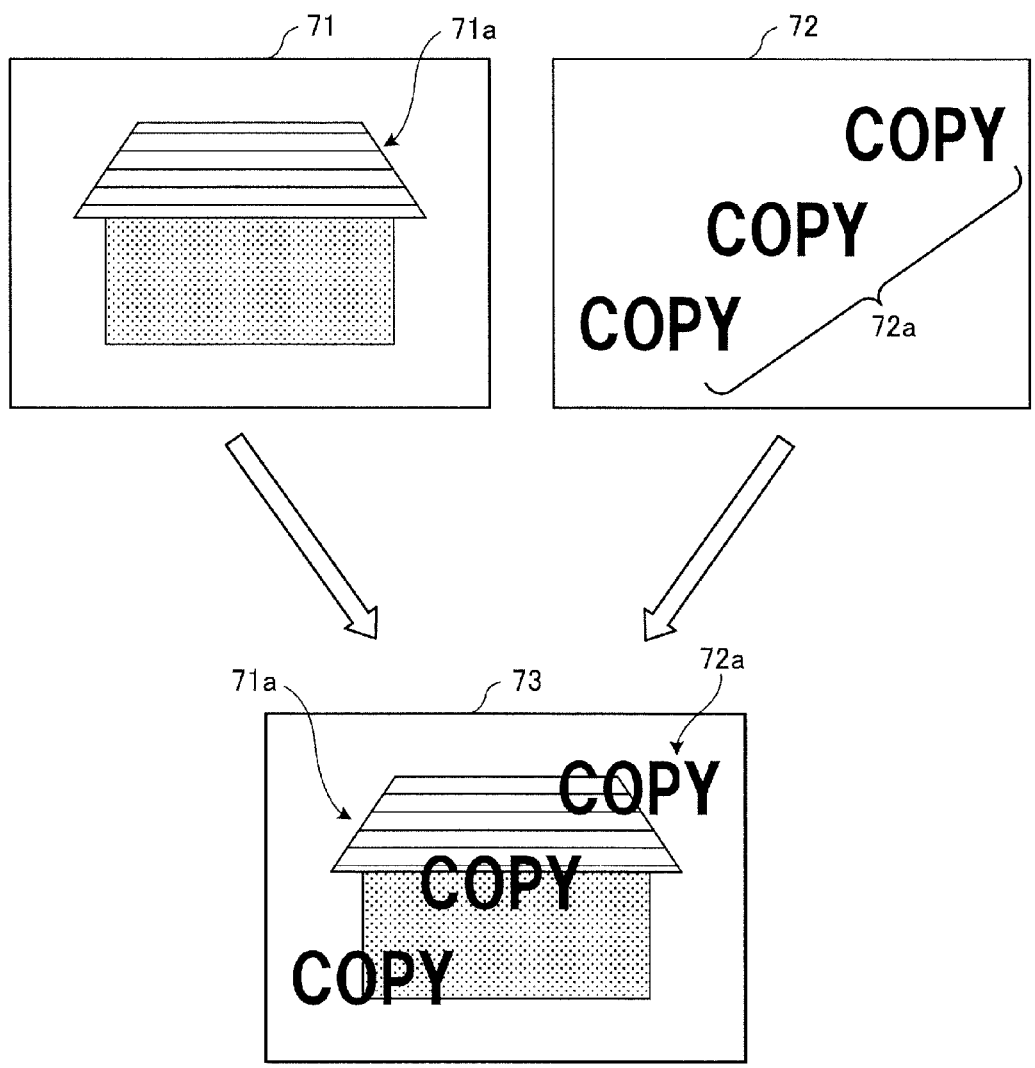
FIG. 5 is a diagram showing an example of a composite image of an image formed with normal toner and an image formed with a luminescent toner.

FIG. 5 is a diagram showing an example of a composite image (image 73) of an image 71 formed with the normal toner and an image 72 formed with the luminescent toner (mark image). The image 71 is an image obtained by having the image scanning device 200 optically scan the image of the document. The image 72 is the mark image based on template data prestored in the storage unit 140. The image 73 is the image printed on the sheet, that is, the composite image of the image 71 and the image 72.

The image 73 includes a color image 71a printed in a normal print operation by using the normal toner (e.g., the image of a building in the image 73) and an image 72a as the mark image printed in the spot color print operation by using the luminescent toner (e.g., the letters "COPY" in the image 73). It is desirable that the mark image of the luminescent toner (image 72a) be formed as an upper layer on the image 71a of the normal toner. In cases where a UV toner is used as the luminescent toner, the mark image (image 72a) formed on the sheet is transparent under visible light (in a state of being illuminated with visible light), and becomes visible as in the image 73 in FIG. 5 when irradiated with ultraviolet rays, for example.

In the image 73, the template data image like "COPY" as the image 72a printed as the mark image is a UV toner image, for example. Since the UV toner image is transparent when no ultraviolet rays are applied thereto, the user generally cannot visually recognize the template data image (mark image) under visible light. However, irradiating the template data image with ultraviolet rays from a black light or the like causes the template data image to emit visible light (e.g., the letters "COPY" emitting light), which allows the user to visually recognize the template data image.

<<1-4>> Effects of Embodiment

As described above, with the image forming apparatus 1 according to the first embodiment, when a mark image formed with luminescent toner (e.g., UV toner) is printed on a recording medium, the type of the transmission source of the image printed on the recording medium (i.e., the image in which the image 71 has been formed with the normal toner) can be identified.

Further, when the copy function of the image forming apparatus 1 (making a copy) is used, the image 71 of the normal toner is formed on the recording medium on the basis of the image scanned by the image scanning device 200 (image of the original) while printing the mark image such as "COPY" on the image 71 formed on the recording medium, which clearly indicates that the printed sheet on the stacker 28 is printed matter (copy) ejected from the image forming apparatus 1 (specifically, the image forming device 100). Therefore, it is possible to distinguish printed matter (copy) obtained by copying the original and the original.

Furthermore, since the mark image superimposed on the image 71 of the normal toner is printed by using UV toner, satisfactory print quality (copy quality) of the printed matter (copy) with the mark image superimposed thereon can be secured without hindering the image forming operation using the normal toner.

Moreover, the mark image can be formed as a template in a fixed form irrespective of the type of the image scanned by the image scanning device 200.

When the images are formed with the toner, the images (i.e., toner images) of respective colors are stacked from a bottom layer to a top layer on the recording medium. In this case, visibility of the toner image of the top layer is better than that of the toner image of the bottom layer. Thus the mark image (luminescent image formed with the luminescent developer) may be formed as the top layer of the toner image layer (toner layer) on the recording medium in order to improve the visibility of the mark image, for example. When the color image (i.e., the toner image formed with the normal toner) is intended to emphasize rather than the mark image, the mark image is formed as the bottom layer. In this way the desired image can be obtained by changing the order of forming the images (including the image formed with the normal toner and the image formed with the luminescent toner) according to the image (toner image) intended to emphasize on the recording medium.

In the present embodiment, the example of forming the color image with the normal toner and the mark image with the luminescent toner by the image forming apparatus 1 as an electrophotographic system device is described. However, the present embodiment is not limited to the example described above. The color image formed with the normal toner and the mark image formed with the luminescent toner may be formed by using an inkjet system device such as an inkjet printer, for example. In this case, an ink image can be formed on the recording medium by a head for inkjet system (inkjet head) as mechanism for forming the image on the recording medium, for example. In this case, the ink image may be formed by using the inkjet head instead of the process unit as the image forming unit which forms the image. When the color image is formed by the inkjet system device, the color image is can be formed by using normal color ink such as yellow ink, magenta ink, cyan ink, and black ink. Further, the luminescent material can be used to form the mark image instead of pigment and dye used for normal color ink when the color image is formed by the inkjet system device. In the present embodiment, the example of forming the toner image as developer image formed on the recording medium is described. However, the ink image as the developer image may be formed on the recording medium instead of the toner image.

<<2>> Second Embodiment

An image forming apparatus according to a second embodiment of the present invention differs from the image forming apparatus according to the first embodiment in the processing performed by the controller 120 of the image forming device 100. In the other features, the image forming apparatus of the second embodiment is equivalent to the image forming apparatus of the first embodiment. Thus, the following description of the second embodiment will be given referring also to FIGS. 1 and 2.

FIG. 6 is a flowchart showing an example of the operation of the image forming device 100 of the image forming apparatus according to the second embodiment. First, the judgment section 121 of the controller 120 judges the transmission source of the input image data (received data) Di received by the transmission/reception section 110 (step S11). For example, in the second embodiment, the judgment section 121 judges whether the transmission source is the image scanning device 200 (scanner), a host PC or a facsimile machine. However, the types of the transmission source are not limited to the examples described in the second embodiment.

When the transmission source is judged to be the scanner in the step S11 (step S11: SCANNER), the main control section 122 of the controller 120 receives scanner data Da (step S21).

Subsequently, the main control section 122 of the controller 120 refers to the table 141 regarding the image superimposition setting (setting in regard to the mark image of the luminescent toner) stored in the storage unit 140 (step S22).

Subsequently, the main control section 122 of the controller 120 judges whether to perform the spot color print operation or not (step S23). When the image superimposition setting is the mark image "ON" setting, the judgment in the step S23 is YES and the main control section 122 of the controller 120 controls the drive control section 123 so as to perform the printing by use of the normal toner on the basis of the scanner data Ds while controlling the drive control section 123 so as to print the mark image with the luminescent toner (step S51).

When the transmission source is the scanner, as shown in FIG. 5, the main control section 122 of the controller 120 selects a template data image for cases where the transmission source is the scanner (hereinafter referred to also as a "scanner-dedicated mark image") as the mark image from a plurality of template data images stored in the storage unit 140 and prints the scanner-dedicated mark image (step S51). For example, when the transmission source is the scanner, the main control section 122 of the controller 120 selects the image 72a as the mark image and prints the image 72a on the sheet as shown in FIG. 5.

When the transmission source is judged to be a host PC in the step S11 (step S11: PC), the main control section 122 of the controller 120 receives external image data De whose transmission source is the host PC (step S31).

Subsequently, the main control section 122 of the controller 120 refers to the table 141 regarding the image superimposition setting (setting in regard to the mark image of the luminescent toner) stored in the storage unit 140 (step S32).

Subsequently, the main control section 122 of the controller 120 judges whether to perform the spot color print operation or not (step S33). When the image superimposition setting is the mark image "ON" setting, the judgment in the step S33 is YES and the main control section 122 of the controller 120 controls the drive control section 123 so as to perform the printing by use of the normal toner on the basis of the received print data while controlling the drive control section 123 so as to print the mark image with the luminescent toner (step S51).

Figure 7A:
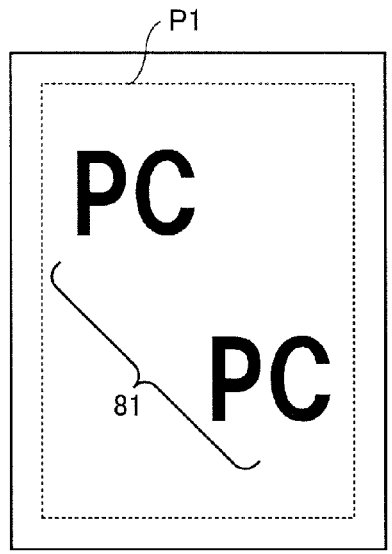
FIGS. 7A and 7B are diagrams each showing an example of a mark image formed with the luminescent toner printed in a printable region of a sheet of paper.
Figure 7B:
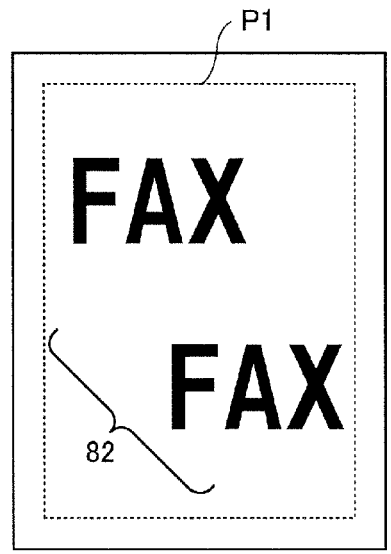

FIGS. 7A and 7B are diagrams each showing an example of the mark image of the luminescent toner printed in a printable region P1 of the sheet. The printable region P1 is a region on the sheet in which at least the first process units 2Y, 2M, 2C and 2K form a toner image. The mark image (image 81) in FIG. 7A illustrates an example of the mark image used when the transmission source is a host PC. The mark image (image 82) in FIG. 7B illustrates an example of the mark image used when the transmission source is a facsimile machine. In cases where UV toner is used as the luminescent toner, the mark image (image 81, 82) formed on the sheet is transparent under visible light, and becomes visible as shown in FIGS. 7A and 7B when irradiated with ultraviolet rays, for example.

Figure 8A:
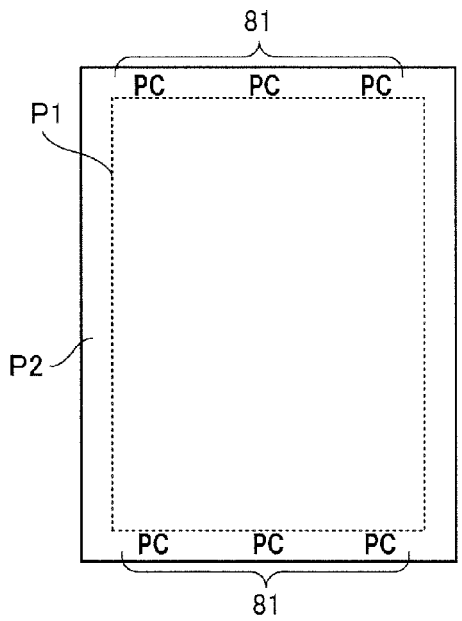
FIGS. 8A and 8B are diagrams each showing an example of a mark image formed with the luminescent toner printed in a marginal region of the sheet of paper other than the printable region.
Figure 8B:
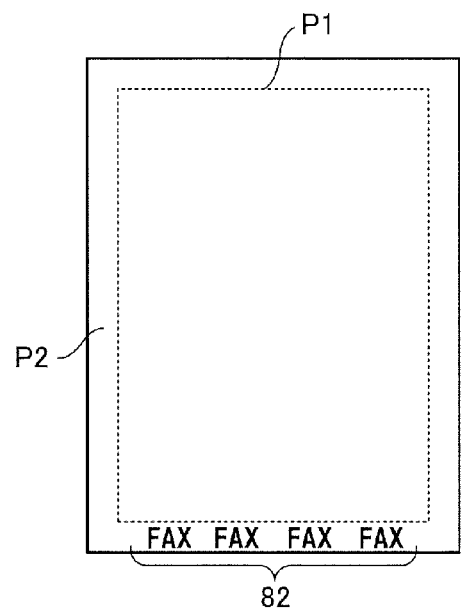

FIGS. 8A and 8B are diagrams each showing an example of the mark image of the luminescent toner printed in a marginal region (region P2) of the sheet other than the printable region P1. The mark image (image 81) in FIG. 8A illustrates an example of the mark image used when the transmission source is a host PC. The mark image (image 82) in FIG. 8B illustrates an example of the mark image used when the transmission source is a facsimile machine. In cases where UV toner is used as the luminescent toner, the mark image (image 81, 82) formed on the sheet is transparent under visible light, and becomes visible as shown in FIGS. 8A and 8B when irradiated with ultraviolet rays, for example.

When the transmission source is a host PC, the main control section 122 of the controller 120 selects a template data image for cases where the transmission source is a host PC (hereinafter referred to also as a "host PC-dedicated mark image") as the mark image from a plurality of template data images stored in the storage unit 140 and prints the host PC-dedicated mark image (step S51). For example, when the transmission source is a host PC, the main control section 122 of the controller 120 selects the image 81 as the mark image and prints the image 81 in the printable region P1 of the sheet as shown in FIG. 7A. As shown in FIG. 8A, it is also possible to form the mark image in the marginal region (region P2) of the sheet other than the printable region P1. Incidentally, there are no limitations on the number and positions of mark images printed.

When the transmission source is judged to be a facsimile machine in the step S11 (step S11: FAX), the main control section 122 of the controller 120 receives external image data De whose transmission source is the facsimile machine (step S41).

Subsequently, the main control section 122 of the controller 120 refers to the table 141 regarding the image superimposition setting (setting in regard to the mark image of the luminescent toner) stored in the storage unit 140 (step S42).

Subsequently, the main control section 122 of the controller 120 judges whether to perform the spot color print operation or not (step S43). When the image superimposition setting is the mark image "ON" setting, the judgment in the step S43 is YES and the main control section 122 of the controller 120 controls the drive control section 123 so as to perform the printing by use of the normal toner on the basis of the received FAX data while controlling the drive control section 123 so as to print the mark image with the luminescent toner (step S51).

When the transmission source is a facsimile machine, the main control section 122 of the controller 120 selects a template data image for cases where the transmission source is a facsimile machine (hereinafter referred to also as a "facsimile-dedicated mark image") as the mark image from a plurality of template data images stored in the storage unit 140 and prints the facsimile-dedicated mark image (step S51). For example, when the transmission source is a facsimile machine, the main control section 122 of the controller 120 selects the image 82 as the mark image and prints the image 82 in the printable region P1 of the sheet as shown in FIG. 7B. As shown in FIG. 8B, it is also possible to print the mark image in the margin (region P2) of the sheet other than the printable region P1. Incidentally, there are no limitations on the number and positions of mark images printed.

When the judgment in the step S23, S33 or S43 is NO, the main control section 122 of the controller 120 controls the drive control section 123 so as to perform the printing by use of the normal toner (normal print operation) without performing the printing of the mark image of the luminescent toner (step S52).

As described above, in the image forming apparatus according to the second embodiment, the main control section 122 of the controller 120 is capable of determining whether to print the mark image of the luminescent toner or not depending on the type of the transmission source.

In cases where the mark image is printed, the main control section 122 of the controller 120 prints the mark image by selecting a template data image depending on the type of the transmission source, which makes it possible to distinguish whether the printed sheet ejected from the image forming apparatus (specifically, the image forming device 100) is printed matter (copy) obtained by the copy function, printed matter obtained by the print function (printing based on a command from a host PC), or printed matter obtained by the FAX function. In other words, the type of the transmission source of the image printed on the recording medium (i.e., the image in which the image 71 has been formed with the normal toner) can be identified.

Especially in cases where the transmission source is the scanner among the multiple types of transmission sources (i.e., in cases of performing the printing by the copy function), the printing of the mark image by use of the luminescent toner makes it possible to distinguish whether a printed sheet left behind in the vicinity of the image forming apparatus (e.g., the image scanning device 200, the stacker 28, etc.) is the original or a copy.

What is claimed is:

1. An image forming apparatus comprising:
an image forming device which forms an image on a recording medium; and
an image scanning device which transmits scanned image data generated by optically scanning an image to the image forming device; wherein:
the image forming device includes:
a receiver which receives at least one of external image data transmitted from an external device and the scanned image data transmitted from the image scanning device as input image data;
a first image forming unit which forms a developer image based on the input image data on the recording medium;
a second image forming unit which forms a mark image on the recording medium with luminescent developer containing a luminescent material, the luminescent material emitting visible light; and
a controller which determines whether to make the second image forming unit form the mark image or not depending on a type of a transmission source of the input image data.

2. The image forming apparatus according to claim 1, wherein the luminescent material transits from ground state to an excited state by receiving energy.

3. The image forming apparatus according to claim 1, wherein the luminescent material transits from ground state to an excited state by receiving ultraviolet rays.

4. The image forming apparatus according to claim 1, wherein the controller makes the second image forming unit form the mark image when the type of the transmission source is the image scanning device.

5. The image forming apparatus according to claim 4, wherein the mark image formed by the second image forming unit when the type of the transmission source is the image scanning device includes at least one of a letter, a figure, and a symbol indicating that the transmission source is the image scanning device.

6. The image forming apparatus according to claim 1, wherein the controller does not make the second image forming unit form the mark image when the type of the transmission source is the external device.

7. The image forming apparatus according to claim 1, wherein when the type of the transmission source is the external device, the controller makes the second image forming unit form the mark image indicating the type of the external device as the transmission source.

8. The image forming apparatus according to claim 7, wherein:
   the external device is one of a facsimile machine, a personal computer, and an information storage device, and
   the mark image formed by the second image forming unit when the type of the transmission source is the external device includes at least one of a letter, a figure, and a symbol indicating one of the facsimile machine, the personal computer, and the information storage device as the type of the transmission source.

9. The image forming apparatus according to claim 1, wherein the second image forming unit forms the mark image in a printable region on the recording medium in which the first image forming unit forms the developer image.

10. The image forming apparatus according to claim 1, wherein the second image forming unit forms the mark image in a marginal region on the recording medium other than a printable region in which the first image forming unit forms the developer image.

11. The image forming apparatus according to claim 1, wherein on the recording medium, the mark image formed by the second image forming unit is formed as an upper layer on the developer image formed by the first image forming unit.

12. The image forming apparatus according to claim 1, wherein the mark image is transparent under visible light and is visually recognizable when irradiated with ultraviolet rays.

13. The image forming apparatus according to claim 1, wherein the luminescent developer is fluorescent toner which emits light by being irradiated with ultraviolet rays.

14. The image forming apparatus according to claim 1, wherein the developer image based on the input image data is formed with toner.

* * * * *